United States Patent

[11] 3,592,428

| [72] | Inventor | Le Roy F. McFarlane |
| | | 718 Crane Road, St. Charles, Ill. 60174 |
| [21] | Appl. No. | 773,163 |
| [22] | Filed | Nov. 4, 1968 |
| [45] | Patented | July 13, 1971 |

[54] CABLE CLAMPS
7 Claims, 9 Drawing Figs.

[52] U.S. Cl. .................................................. 248/74, 24/16, 24/73
[51] Int. Cl. ..................................................... F16l 3/14, F16l 3/22
[50] Field of Search ......................................... 248/74, 71; 24/16 BP, 73, 204, 201.3, 208.3; 138/128; 174/72 A, 40.1; 161/123, 119

[56] References Cited
UNITED STATES PATENTS

| 2,354,485 | 7/1944 | Slaughter | 248/74 X |
| 2,800,743 | 7/1957 | Meehan | 24/204 X |
| 3,106,941 | 10/1963 | Plummer | 138/128 |
| 3,118,644 | 1/1964 | Wernig | 248/74 X |
| 3,325,084 | 6/1967 | Ausnit | 24/204 X |
| 3,341,903 | 9/1967 | Buntic | 24/16 |
| 3,447,207 | 6/1969 | Danzer | 24/16 |
| 3,338,284 | 8/1967 | Ausnit | 24/201.3 X |
| 3,331,105 | 7/1967 | Gordon | 24/16 |

FOREIGN PATENTS

| 985,375 | 3/1965 | Great Britain | 248/68 |
| 327,839 | 2/1958 | France | 24/16 |

*Primary Examiner*—Chancellor E. Harris
*Attorney*—Elmer L. Zwickel

ABSTRACT: A cable clamp formed of extruded resilient thermoplastic material and having mating elements on one or both faces so as to enable the clamp to be secured about a bundle of wires or the like and/or to a support surface.

PATENTED JUL 13 1971
3,592,428
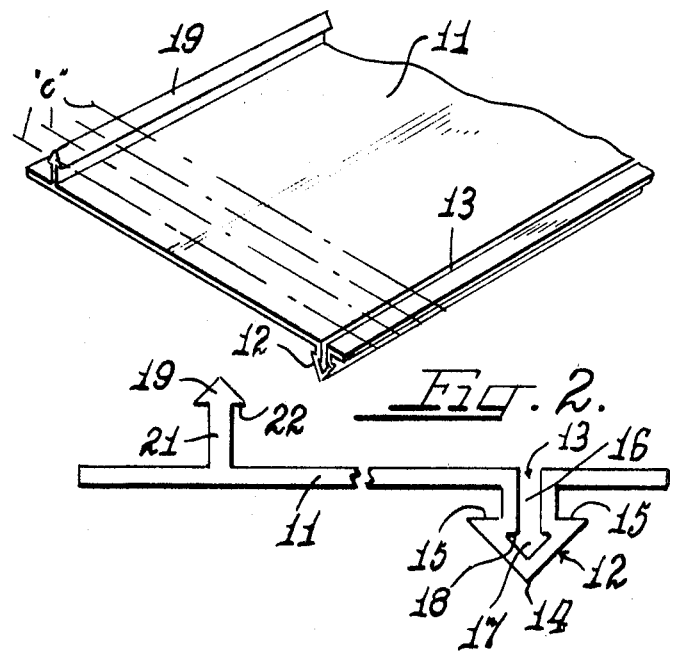
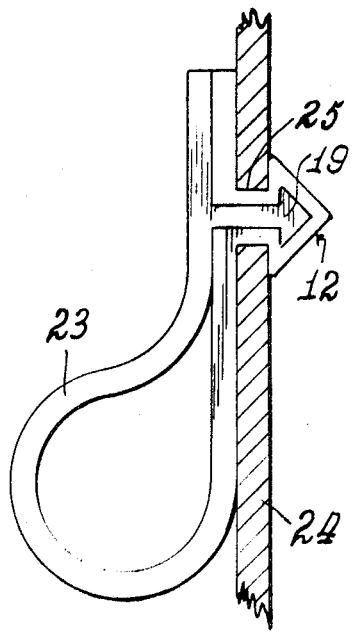
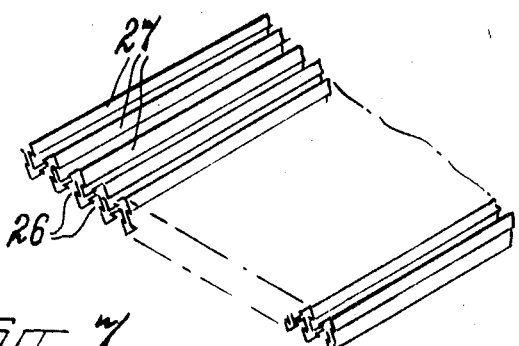
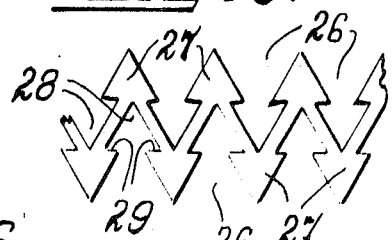
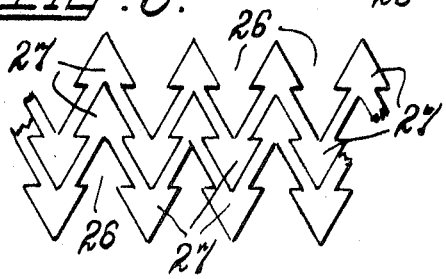
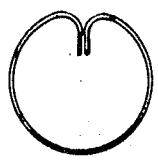
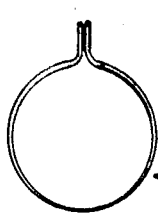
Inventor:
Leroy F. McFarlane.
by Charles H. Redman
Atty.

CABLE CLAMPS

The invention relates to improvements in cable clamps or sheaths of a character utilized to secure a bundle of wires together into a cable assembly Heretofore, cable clamps of this general nature have been provided with male and female elements on their ends which are produced by the process of molding. Such molded clamps are relatively expensive to manufacture, and none of the known types of such clamps embody any means to facilitate the use of one of the mating elements to mount the clamp on a support surface.

In one embodiment of the present disclosure, individual straps are formed from an extruded strip or sheet which is formed along one edge with a longitudinal deformation that defines on one face a longitudinal channel or slot and on its opposite face a longitudinal rib. The rib has an arrowhead configuration, in section, and the channel is similarly shaped. The other edge of the sheet is formed on one face with a rib also of arrowhead shape. Individual straps are severed from the sheet and when applied to a bundle of wires, the arrowhead protuberance on one end of such a strap may be engaged in the arrowhead channel in the other end and the arrowhead-shaped rib on the side opposed to the channel may be used to mount the strap on a support panel.

As an alternate structure, an extruded sheet may be formed all over both of its surfaces with a plurality of rows of slots and protuberances to provide a sheath for a bundle of wires. In the latter instance, any one or more of the arrowheaded protuberances may be engaged in any one or more of the slots depending upon the size of the bundle of wires. If desired, the sheet may be cut to provide a multitude of individual straps. These structures and their functions are more particularly recited hereinafter.

It is, therefore, an object of the invention to provide cable sheaths or straps of the character referred to.

Another object is to provide an extrusion which is useful as a cable sheath or clamp.

Another object is to provide a cable sheath or clamp with a multitude of complemental male and female elements.

Another object is to provide a bundle strap with novel means to secure it to a support panel.

Another object is to provide a thermoplastic clamp or sheath that is not expensive to manufacture and which is very efficient in use.

Other objects and advantages of the invention will become apparent with reference to the following description and accompanying drawings.

In the drawings:

FIG. 1 is a perspective view of a fragment of an extruded sheet from which clamp straps are severed;

FIG. 2 is an enlarged detail of one such strap;

FIG. 3 is a view showing the strap of FIG. 2 utilized to secure a bundle of wires to a support panel;

FIG. 4 is a perspective view of an extruded sheath;

FIG. 5 is an enlarged detail of a portion of the sheath;

FIG. 6 is an enlarged detail view of two portions of the sheath overlapped and joined; and, FIGS. 7, 8 and 9 are detail views showing representative applications of the sheath shown in FIG. 4.

Referring to the exemplary structure illustrated in FIGS. 1, 2 and 3 of the accompanying drawings, the plastic cable clamps are manufactured in sheet form by an extrusion process. As shown, the extruded sheet 11 has on one longitudinal edge a protuberance 12 defining on the opposed side or face a longitudinal slot 13. The protuberance is substantially arrowhead in transverse section providing an apex edge 14 and opposed shoulders 15 spaced therefrom. The longitudinal slot 13 is similarly shaped to provide a relatively narrow entrance throat 16 opening into a larger cavity 17 having reverse shoulders 18 at the juncture of the throat with the cavity. The other longitudinal edge of the sheet is formed, on the same face as that bearing the longitudinal slot 13, with a rib 18 that is shaped to provide a pointed head portion 19 and a reduced neck 21 having reversedly facing shoulders 22 at the base of the head The material of the sheet is resiliently yieldable, it being formed of suitable thermoplastic material such as for example, but not by way of limitation, polethylene, polypropolyne extrudable rubber compounds, Saran, nylon, and ethyl cellulose.

Sheets formed with the ribs and slots described above are then cut transversely into strips, as along lines "c" (FIG. 1), so as to provide a multitude of individual clamp straps 23. In use, these straps are wrapped around a bundle of wires and the rib section 19 is manually pressed into the slot 13. The resiliency of the material permits this assembly and the inherent rebound of the material resists separation of the mated elements.

Frequently it is desired or necessary to secure a bundle of wires to a support surface, such as the metal panel 24, as shown in FIG. 3. In such event the protuberance 12 is press-fitted into a hole 25 in the panel sufficiently to locate the shoulders 15 behind the back face of the panel. When the clamp strap is wrapped around the bundle of wires and the pointed head 19 on its free end is press-fitted into the slot 13, the head of protuberance 12 is expanded sufficiently to retain the shoulders 15 behind the panel and prevent removal of the strapped bundle from the panel 24.

In the embodiment shown in detail in FIGS. 4 to 6, the entire plastic sheet is covered on both sides with a closely spaced series of slots 26 and opposed protuberances 27. These protuberances and slots are so closely spaced that the walls of two adjacent protuberances constitute the sidewalls of the slot between them. In fact, the slots 26 have tapered throats defining between them the arrowhead-shaped protuberances 27 and cavities 28 defined by shoulders 29 at the base of each protuberance 27. The sheet may be used in sheet form to provide a sheath for a bundle of wires or it may be cut into strips to provide individual clamp straps. In either event, when the sheet or clamp strap is wrapped around a bundle of wires, with its ends in overlapping position, as shown in FIGS. 6 and 7, the protuberances 27 on one overlapping face are press-fitted into the slots and cavities 26—28 on the other overlapping face. There is therefore, a dual interlocking of one face with the other over the entire overlapped areas.

It should also be apparent that, with this overall pattern of slots and protuberances on both faces of the sheet or clamp strap, the sheet or strap may be assembled with its ends turned in as shown in FIG. 8, or in the manner shown in FIG. 9 wherein the end areas extend outwardly radially from the bundle.

I claim:

1. An extruded sheet of resilient plastic material, said sheet being of indeterminable length and having parallel side edges, a rib formed on one face of said sheet inwardly of one side edge and extending the length thereof, a second rib formed on the other face of said sheet inwardly of the other side edge and extending the length thereof, said last-named rib having a slot therein coextensive with its length opening onto the first-named face of said sheet, said sheet being transversely severed to provide a multitude of individual straps each having rib formations inwardly of its opposite ends.

2. The structure recited in claim 1, in which a plurality of said ribs are provided on said sheet.

3. The structure recited in claim 1, in which both ribs are arrow-shaped in transverse section.

4. The structure recited in claim 1, in which both ribs and the slot are arrow-shaped in transverse section.

5. An extruded clamp strap fabricated from plastic material comprising an elongated ribbonlike body, a transverse rib on one face of the strap inwardly of one end and of a length corresponding to the width of said strap, a transverse rib on the other face of said strap inwardly of the other end and of a length corresponding to the width of said strap, said last-named rib having a slot in its base coextensive with its length and opening onto the first-named face of the strap.

6. The clamp strap recited in claim 5, in which both ribs are arrow-shaped in transverse section.

7. The clamp strap recited in claim 5, in which both ribs and the slot are arrow-shaped in transverse section.